(12) United States Patent
Ortmann et al.

(10) Patent No.: US 10,106,150 B2
(45) Date of Patent: Oct. 23, 2018

(54) METHODS AND SYSTEM FOR OPERATING A HYBRID VEHICLE

(71) Applicant: Ford Global Technologies, LLC, Dearborn, MI (US)

(72) Inventors: Walter Joseph Ortmann, Saline, MI (US); Yanan Zhao, Ann Arbor, MI (US); Ming Lang Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/457,860

(22) Filed: Mar. 13, 2017

(65) Prior Publication Data

US 2018/0257638 A1    Sep. 13, 2018

(51) Int. Cl.
*B60W 20/40* (2016.01)
*B60L 11/14* (2006.01)
(Continued)

(52) U.S. Cl.
CPC .............. *B60W 20/40* (2013.01); *B60L 11/14* (2013.01); *B60L 11/1861* (2013.01); *B60W 20/30* (2013.01); *B60L 2210/10* (2013.01); *B60L 2240/42* (2013.01); *B60L 2240/44* (2013.01); *B60L 2240/486* (2013.01); *B60L 2240/507* (2013.01); *B60W 2510/06* (2013.01); *B60W 2510/0657* (2013.01); *B60W 2520/10* (2013.01); *B60W 2710/06* (2013.01); *B60W 2710/1005* (2013.01); *B60Y 2300/188* (2013.01);
(Continued)

(58) Field of Classification Search
CPC ................. B60W 20/04; B60W 20/30; B60W 2710/1005; B60W 2710/06; B60W 2510/06; B60L 2240/44; B60L 2240/486; Y10S 903/93; B60Y 2300/188; B60Y 2400/428
See application file for complete search history.

(56) References Cited

U.S. PATENT DOCUMENTS 4,974,875 A    12/1990  Sugasawa et al.
6,681,180 B2    1/2004  Bevly et al.
(Continued)

FOREIGN PATENT DOCUMENTS

JP          2015-90185      *  5/2015
WO    WO 2015/117937 A1  *  8/2015

OTHER PUBLICATIONS

Zhao, Yanan, et al., "Methods and System for Hybrid Vehicle Regenerative Braking," U.S. Appl. No. 15/457,695, filed Mar. 13, 2017, 67 pages.
(Continued)

*Primary Examiner* — Michael J Zanelli
(74) *Attorney, Agent, or Firm* — David Kelley; McCoy Russell LLP

(57) ABSTRACT

Methods and systems are provided for operating a driveline of a hybrid vehicle that includes an internal combustion engine, an electric machine, and a transmission are described. In one example, gears of a transmission may be unlocked from layshafts while an engine is stopped to conserve energy. Alternatively, the gears may be locked and unlocked from layshafts in response to vehicle operating conditions while the engine is stopped to improve driveline response.

19 Claims, 6 Drawing Sheets

(51) Int. Cl.
*B60W 20/30* (2016.01)
*B60L 11/18* (2006.01)

(52) U.S. Cl.
CPC ..... *B60Y 2300/91* (2013.01); *B60Y 2400/112* (2013.01); *B60Y 2400/428* (2013.01); *Y10S 903/93* (2013.01)

(56) References Cited

U.S. PATENT DOCUMENTS

| | | | |
|---|---|---|---|
| 6,959,971 B2 | 11/2005 | Tsunehara | |
| 7,774,103 B2 | 8/2010 | Deng et al. | |
| 8,011,460 B2* | 9/2011 | Hobel | B60K 6/387 180/65.22 |
| 8,322,246 B2* | 12/2012 | Doelling | F16H 63/36 74/473.25 |
| 8,795,115 B2* | 8/2014 | Puiu | B60K 6/365 475/207 |
| 9,297,455 B2 | 3/2016 | Li | |
| 2002/0163250 A1 | 11/2002 | Huls et al. | |
| 2011/0070999 A1* | 3/2011 | Soliman | B60W 10/026 477/3 |
| 2011/0125353 A1* | 5/2011 | Komeda | B60K 6/387 701/22 |
| 2011/0245036 A1* | 10/2011 | Lochocki, Jr. | B60W 10/02 477/167 |
| 2014/0297120 A1 | 10/2014 | Cotgrove | |
| 2015/0159735 A1* | 6/2015 | Dzafic | F16H 3/006 74/661 |
| 2015/0298702 A1 | 10/2015 | Reinisch et al. | |
| 2015/0360675 A1* | 12/2015 | Nefcy | F16H 61/0031 701/22 |
| 2017/0182996 A1* | 6/2017 | Hose | B60W 20/40 |

OTHER PUBLICATIONS

Zhao, Yanan, et al., "Methods and System for a Hybrid Vehicle," U.S. Appl. No. 15/457,771, filed Mar. 13, 2017, 75 pages.
Fodor, Michael Glenn, et al., "Methods and System Providing Vehicle Drift," U.S. Appl. No. 15/457,815, filed Mar. 13, 2017, 59 pages.

* cited by examiner

METHODS AND SYSTEM FOR OPERATING A HYBRID VEHICLE

FIELD

The present description relates generally to methods and systems for controlling a driveline of a hybrid vehicle. The methods and systems may be particularly useful for hybrid vehicles that include a dual clutch transmission.

BACKGROUND/SUMMARY

From time to time, an internal combustion engine of a hybrid vehicle may be stopped while the hybrid vehicle continues to move along a drive path. The internal combustion engine may be stopped to conserve fuel while an electric machine provides propulsive effort or converts kinetic energy of the hybrid vehicle into electrical energy. Electrical energy produced by the electric machine may be stored for later use in a battery, capacitor, or other electric energy storage device. While the electric machine may be rather efficient at converting the vehicle's kinetic energy into electrical energy, a substantial amount of the vehicle's kinetic energy may still be lost. Therefore, it may be desirable to improve the efficiency of converting the vehicle's kinetic energy into electrical energy.

The inventors herein have recognized the above-mentioned issues and have developed a driveline operating method, comprising: stopping rotation of an engine of a vehicle in response to an engine stop request while the vehicle is moving; and ceasing to rotate a first input shaft and a second input shaft of a transmission at a gear ratio multiple of a transmission output shaft speed in response to the engine stop request while the vehicle is moving, the transmission directly coupled to the engine.

By ceasing to rotate first and second transmission input shafts at a gear ratio multiple of a transmission output shaft speed, it may be possible to reduce losses associated with rotating transmission input shafts and convert a portion of a vehicle's kinetic energy that would otherwise be used to rotate transmission shafts into electrical energy. In particular, rotation of transmission input shafts may be stopped in response to stopping engine rotation or a request to stop engine rotation so that a vehicle's kinetic energy is not used to rotate transmission input shafts. The vehicle's kinetic energy may then be converted into electrical energy via an electric machine in the driveline so that a larger portion of the vehicle's kinetic energy may be converted into electrical energy. Further, in examples where improved vehicle response has higher priority than improving driveline efficiency, transmission gears may be shifted and pre-selected while the vehicle is moving and while the engine is stopped to reduce an amount of time to couple an engine to vehicle wheels.

The present description may provide several advantages. Specifically, the approach may improve efficiency of converting a vehicle's kinetic energy conversion into electrical energy. Further, the approach may reduce an amount of time to restart an engine and provide engine torque to vehicle wheels. Further still, the approach may reduce driveline torque disturbances if engine restarting is requested.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 4:
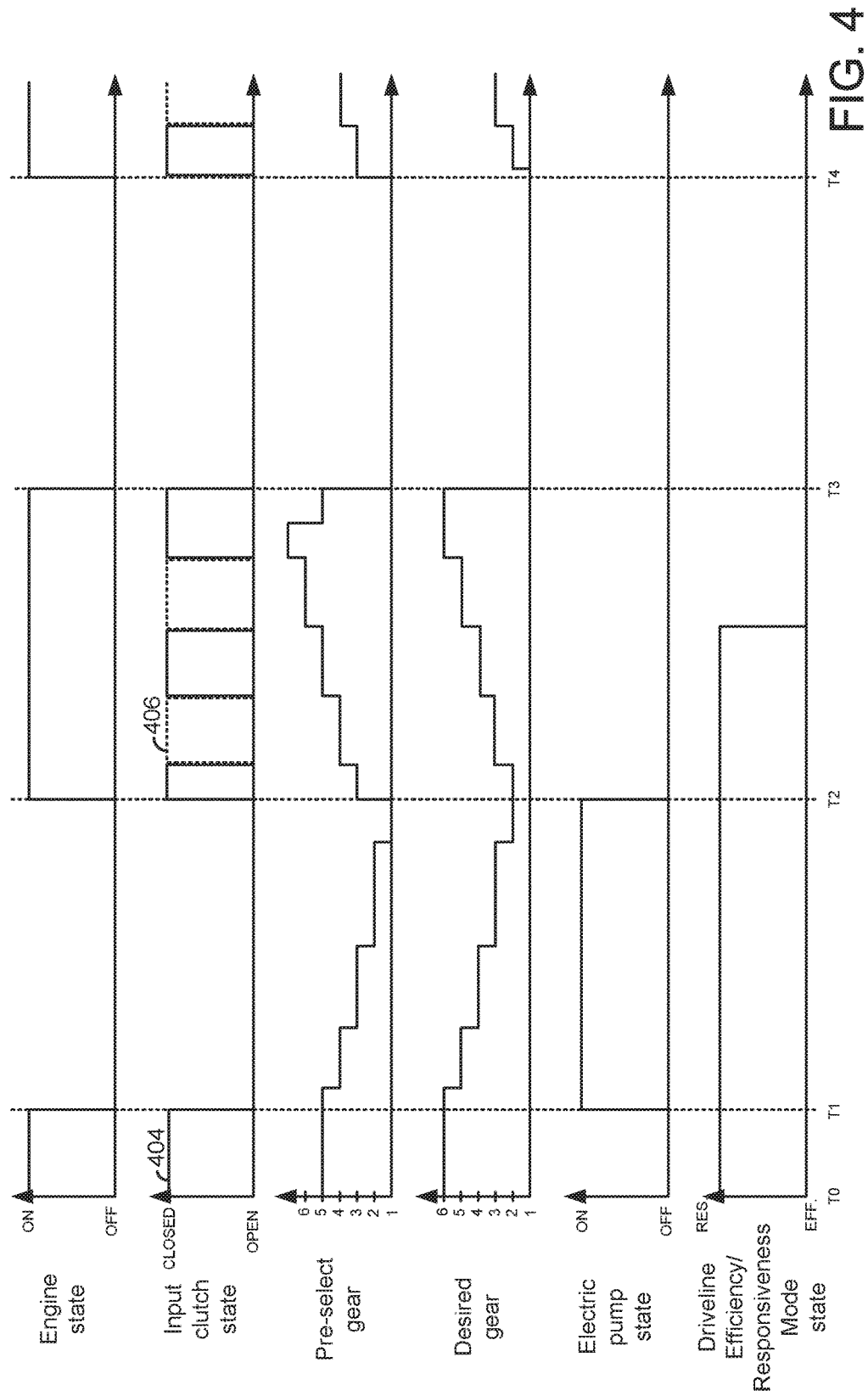
FIG. 4 is a prophetic driveline operating sequence.
Figure 5:
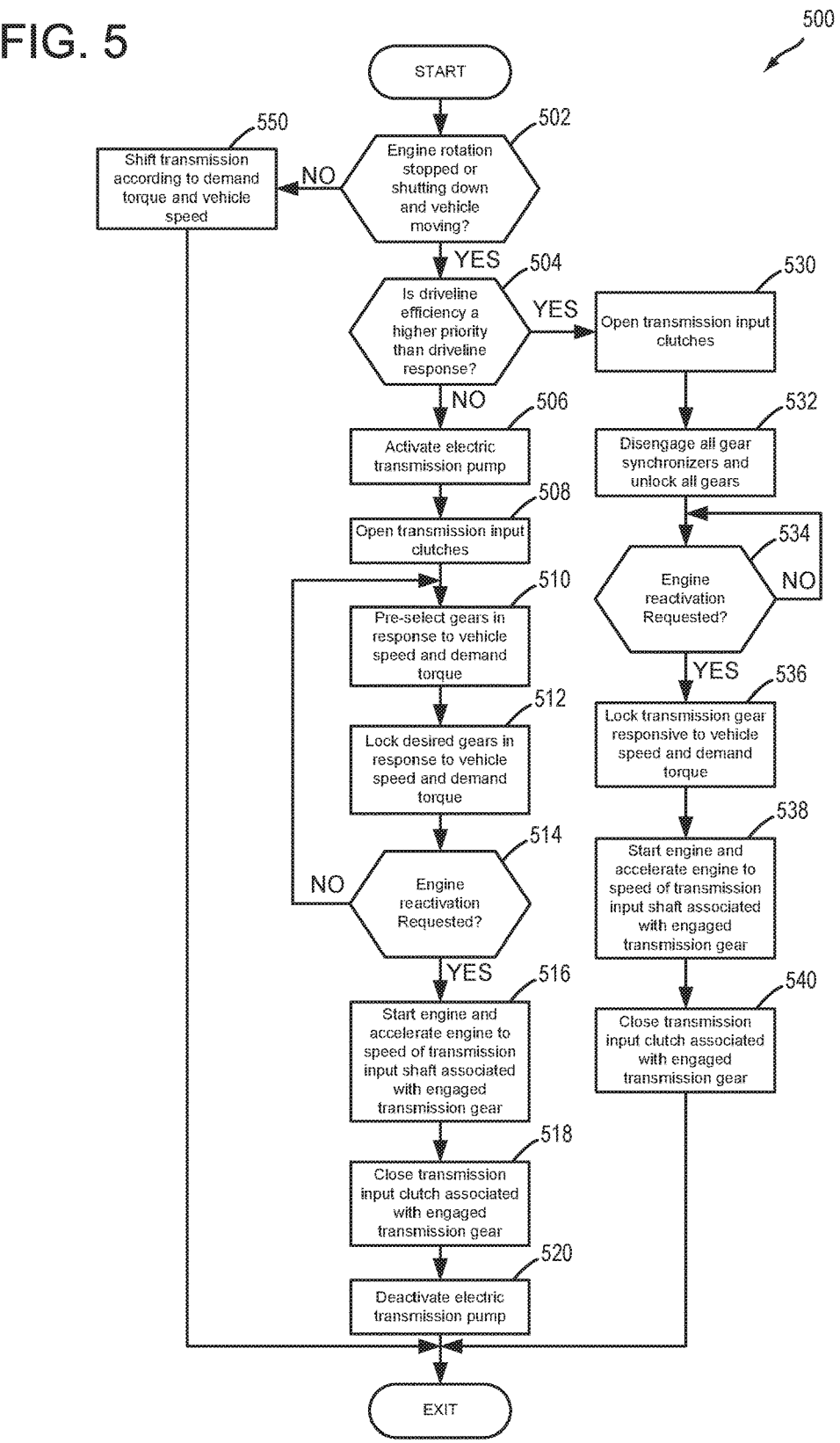
FIG. 5 is a flowchart of a method to operate a hybrid vehicle driveline.

The following description relates to systems and methods for operating a driveline of a hybrid vehicle. FIGS. 1A-3 show an example hybrid vehicle system that includes a driveline with a motor, an integrated starter/generator, a dual clutch transmission, and a rear drive unit with an electric machine that is positioned downstream of the dual clutch transmission. FIG. 4 shows a prophetic driveline operating sequence for improving vehicle kinetic energy utilization. FIG. 5 is a flowchart of an example of operating a hybrid vehicle driveline.

Figure 1A:
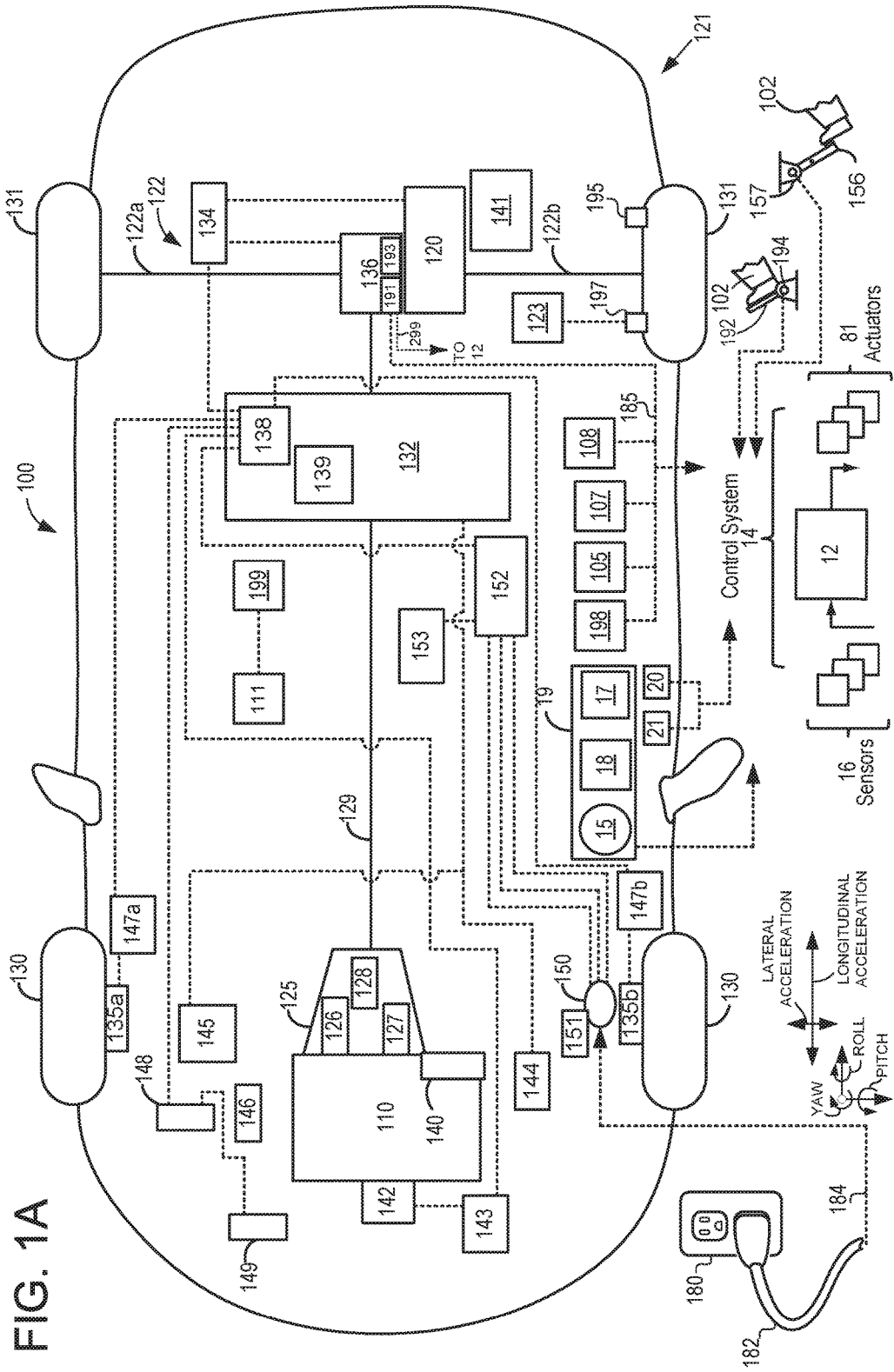
FIG. 1A is a schematic diagram of a hybrid vehicle driveline.

FIG. 1A illustrates an example vehicle propulsion system 100 for vehicle 121. Vehicle propulsion system 100 includes at least two power sources including an internal combustion engine 110 and an electric machine 120. Electric machine 120 may be configured to utilize or consume a different energy source than engine 110. For example, engine 110 may consume liquid fuel (e.g. gasoline) to produce an engine output while electric machine 120 may consume electrical energy to produce an electric machine output. As such, a vehicle with propulsion system 100 may be referred to as a hybrid electric vehicle (HEV). Throughout the description of FIG. 1A, mechanical connections between various components is illustrated as solid lines, whereas electrical connections between various components are illustrated as dashed lines.

Vehicle propulsion system 100 has a front axle (not shown) and a rear axle 122. In some examples, rear axle may comprise two half shafts, for example first half shaft 122a, and second half shaft 122b. Vehicle propulsion system 100 further has front wheels 130 and rear wheels 131. The rear axle 122 is coupled to electric machine 120 and to transmission 125 via driveshaft 129. The rear axle 122 may be driven either purely electrically and exclusively via electric machine 120 (e.g., electric only drive or propulsion mode, engine is not combusting air and fuel or rotating), in a hybrid fashion via electric machine 120 and engine 110 (e.g., parallel mode), or exclusively via engine 110 (e.g., engine only propulsion mode), in a purely combustion engine-operated fashion. Rear drive unit 136 may transfer power from engine 110 or electric machine 120, to axle 122, resulting in rotation of drive wheels 131. Rear drive unit 136 may include a gear set and one or more clutches to decouple transmission 125 and electric machine 120 from wheels 131. Rear drive unit 136 may include electric machine 120 and axle 122.

A transmission 125 is illustrated in FIG. 1A as connected between engine 110, and electric machine 120 assigned to rear axle 122. In one example, transmission 125 is a dual clutch transmission (DCT). In an example wherein transmission 125 is a DCT, DCT may include a first clutch 126, a second clutch 127, and a gear box 128. DCT 125 outputs torque to drive shaft 129 to supply torque to wheels 131. As will be discussed in further detail below with regard to FIG. 2, transmission 125 may shift gears by selectively opening and closing first clutch 126 and second clutch 127.

Electric machine 120 may receive electrical power from onboard energy storage device 132. Furthermore, electric machine 120 may provide a generator function to convert engine output or the vehicle's kinetic energy into electrical energy, where the electrical energy may be stored at energy storage device 132 for later use by the electric machine 120 or integrated starter/generator 142. A first inverter system controller (ISC1) 134 may convert alternating current generated by electric machine 120 to direct current for storage at the energy storage device 132 and vice versa.

In some examples, energy storage device 132 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 132 may include one or more batteries and/or capacitors.

Control system 14 may communicate with one or more of engine 110, electric machine 120, energy storage device 132, integrated starter/generator 142, transmission 125, etc. Control system 14 may receive sensory feedback information from one or more of engine 110, electric machine 120, energy storage device 132, integrated starter/generator 142, transmission 125, etc. Further, control system 14 may send control signals to one or more of engine 110, electric machine 120, energy storage device 132, transmission 125, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Energy storage device 132 may periodically receive electrical energy from a power source 180 (e.g., a stationary power grid) residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 132 from power source 180 via an electrical energy transmission cable 182. During a recharging operation of energy storage device 132 from power source 180, electrical transmission cable 182 may electrically couple energy storage device 132 and power source 180. In some examples, power source 180 may be connected at inlet port 150. Furthermore, in some examples, a charge status indicator 151 may display a charge status of energy storage device 132.

In some examples, electrical energy from power source 180 may be received by charger 152. For example, charger 152 may convert alternating current from power source 180 to direct current (DC), for storage at energy storage device 132. Furthermore, a DC/DC converter 153 may convert a source of direct current from charger 152 from one voltage to another voltage. In other words, DC/DC converter 153 may act as a type of electric power converter.

While the vehicle propulsion system is operated to propel the vehicle, electrical transmission cable 182 may be disconnected between power source 180 and energy storage device 132. Control system 14 may identify and/or control the amount of electrical energy stored at the energy storage device, which may be referred to as the state of charge (SOC).

In other examples, electrical transmission cable 182 may be omitted, where electrical energy may be received wirelessly at energy storage device 132 from power source 180. For example, energy storage device 132 may receive electrical energy from power source 180 via one or more of electromagnetic induction, radio waves, and electromagnetic resonance. As such, it should be appreciated that any suitable approach may be used for recharging energy storage device 132 from a power source that does not comprise part of the vehicle. In this way, electric machine 120 may propel the vehicle by utilizing an energy source other than the fuel utilized by engine 110.

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132.

Vehicle propulsion system 100 may also include an ambient temperature/humidity sensor 198, and sensors dedicated to indicating the occupancy-state of the vehicle, for example onboard cameras 105, seat load cells 107, and door sensing technology 108. Vehicle system 100 may also include inertial sensors 199. Inertial sensors 199 may comprise one or more of the following: longitudinal, latitudinal, vertical, yaw, roll, and pitch sensors (e.g., accelerometers). Axes of yaw, pitch, roll, lateral acceleration, and longitudinal acceleration are as indicated. As one example, inertial sensors 199 may couple to the vehicle's restraint control module (RCM) (not shown), the RCM comprising a subsystem of control system 14. The control system may adjust engine output and/or the wheel brakes to increase vehicle stability in response to sensor(s) 199. In another example, the control system may adjust an active suspension system 111 responsive to input from inertial sensors 199. Active suspension system 111 may comprise an active suspension system having hydraulic, electrical, and/or mechanical devices, as well as active suspension systems that control the vehicle height on an individual corner basis (e.g., four corner independently controlled vehicle heights), on an axle-by-axle basis (e.g., front axle and rear axle vehicle heights), or a single vehicle height for the entire vehicle. Data from inertial sensor 199 may also be communicated to controller 12, or alternatively, sensors 199 may be electrically coupled to controller 12.

One or more tire pressure monitoring sensors (TPMS) may be coupled to one or more tires of wheels in the vehicle. For example, FIG. 1A shows a tire pressure sensor 197 coupled to wheel 131 and configured to monitor a pressure in a tire of wheel 131. While not explicitly illustrated, it may be understood that each of the four tires indicated in FIG. 1A may include one or more tire pressure sensor(s) 197. Furthermore, in some examples, vehicle propulsion system 100 may include a pneumatic control unit 123. Pneumatic control unit may receive information regarding tire pressure from tire pressure sensor(s) 197, and send said tire pressure information to control system 14. Based on said tire pressure information, control system 14 may command pneumatic control unit 123 to inflate or deflate tire(s) of the vehicle wheels. While not explicitly illustrated, it may be understood that pneumatic control unit 123 may be used to inflate or deflate tires associated with any of the four wheels illustrated in FIG. 1A. For example, responsive to an indication of a tire pressure decrease, control system 14 may command pneumatic control system unit 123 to inflate one or more tire(s). Alternatively, responsive to an indication of a tire pressure increase, control system 14 may command pneumatic control system unit 123 to deflate tire(s) one or more tires. In both examples, pneumatic control system unit 123 may be used to inflate or deflate tires to an optimal tire pressure rating for said tires, which may prolong tire life.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include an accelerometer 20. Vehicle propulsion system 100 may further include an inclinometer 21.

Vehicle propulsion system 100 may further include a starter 140. Starter 140 may comprise an electric motor, hydraulic motor, etc., and may be used to rotate engine 110 so as to initiate engine 110 operation under its own power.

Vehicle propulsion system 100 may further include a brake system control module (BSCM) 141. In some examples, BSCM 141 may comprise an anti-lock braking system or anti-skid braking system, such that wheels (e.g. 130, 131) may maintain tractive contact with the road surface according to driver inputs while braking, which may thus prevent the wheels from locking up, to prevent skidding. In some examples, BSCM may receive input from wheel speed sensors 195.

Vehicle propulsion system 100 may further include a belt integrated starter generator (BISG) 142. BISG may produce electric power when the engine 110 is in operation, where the electrical power produced may be used to supply electric devices and/or to charge the onboard storage device 132. As indicated in FIG. 1A, a second inverter system controller (ISC2) 143 may receive alternating current from BISG 142, and may convert alternating current generated by BISG 142 to direct current for storage at energy storage device 132. Integrated starter/generator 142 may also provide torque to engine 110 during engine starting or other conditions to supplement engine torque.

In some examples, vehicle propulsion system 100 may include one or more electric machines 135a and 135b to propel vehicle 121 or to provide regenerative braking via front wheels 130. Third inverter (ISC3) 147a may convert alternating current generated by electric machine 135a to direct current for storage at the electric energy storage device 132 or provide alternating current to electric machine 135a to propel vehicle 121 Likewise, fourth inverter (ISC4) 147b may convert alternating current generated by electric machine 135b to direct current for storage at the electric energy storage device 132 or provide alternating current to electric machine 135b to propel vehicle 121. Electric machines 135a and 135b may be collectively referred to as front wheel electric machines. Alternatively, a single front wheel electric machine may drive and/or provide regenerative braking to both front wheels 130.

Vehicle propulsion system 100 may further include a power distribution box (PDB) 144. PDB 144 may be used for routing electrical power throughout various circuits and accessories in the vehicle's electrical system.

Vehicle propulsion system 100 may further include a high current fuse box (HCFB) 145, and may comprise a variety of fuses (not shown) used to protect the wiring and electrical components of vehicle propulsion system 100.

Vehicle propulsion system 100 may further include a motor electronics coolant pump (MECP) 146. MECP 146 may be used to circulate coolant to diffuse heat generated by at least electric machine 120 of vehicle propulsion system 100, and the electronics system. MECP may receive electrical power from onboard energy storage device 132, as an example.

Controller 12 may comprise a portion of a control system 14. In some examples, controller 12. Control system 14 is shown receiving information from a plurality of sensors 16 (various examples of which are described herein) and sending control signals to a plurality of actuators 81 (various examples of which are described herein). As one example, sensors 16 may include tire pressure sensor(s) 197, wheel speed sensor(s) 195, ambient temperature/humidity sensor 198, onboard cameras 105, seat load cells 107, door sensing technology 108, inertial sensors 199, etc. In some examples, sensors associated with engine 110, transmission 125, electric machine 120, etc., may communicate information to controller 12, regarding various states of engine, transmission, and motor operation, as will be discussed in further detail with regard to FIG. 1B, FIG. 2 and FIG. 3.

Vehicle propulsion system 100 may further include an air conditioning compressor module 149, for controlling an electric air conditioning compressor (not shown).

Vehicle propulsion system 100 may further include a vehicle audible sounder for pedestrians (VASP) 154. For example, VASP 154 may be configured to produce audible sounds via sounders 155. In some examples, audible sounds produced via VASP 154 communicating with sounders 155 may be activated responsive to a vehicle operator triggering the sound, or automatically, responsive to engine speed below a threshold or detection of a pedestrian.

Vehicle propulsion system 100 may also include an onboard navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., engine 110, BISG 142, DCT 125, and electric machine 130) based on an operator input. Various examples of the operator ignition interface 15 may include interfaces that require a physical apparatus, such as an active key, that may be inserted into the operator ignition interface 15 to start the engine 110 and turn on the vehicle, or may be removed to shut down the engine 110 and turn off the vehicle. Other examples may include a passive key that is communicatively coupled to the operator ignition interface 15. The passive key may be configured as an electronic key fob or a smart key that does not have to be inserted or removed from the ignition interface 15 to operate the vehicle engine 110. Rather, the passive key may need to be located inside or proximate to the vehicle (e.g., within a threshold distance of the vehicle). Still other examples may additionally or optionally use a start/stop button that is manually pressed by the operator to start or shut down the engine 110 and turn the vehicle on or off. In other examples, a remote engine start may be initiated remote computing device (not shown), for example a cellular telephone, or smartphone-based system where a user's cellular telephone sends data to a server and the server communicates with the vehicle controller 12 to start the engine.

Figure 1B:
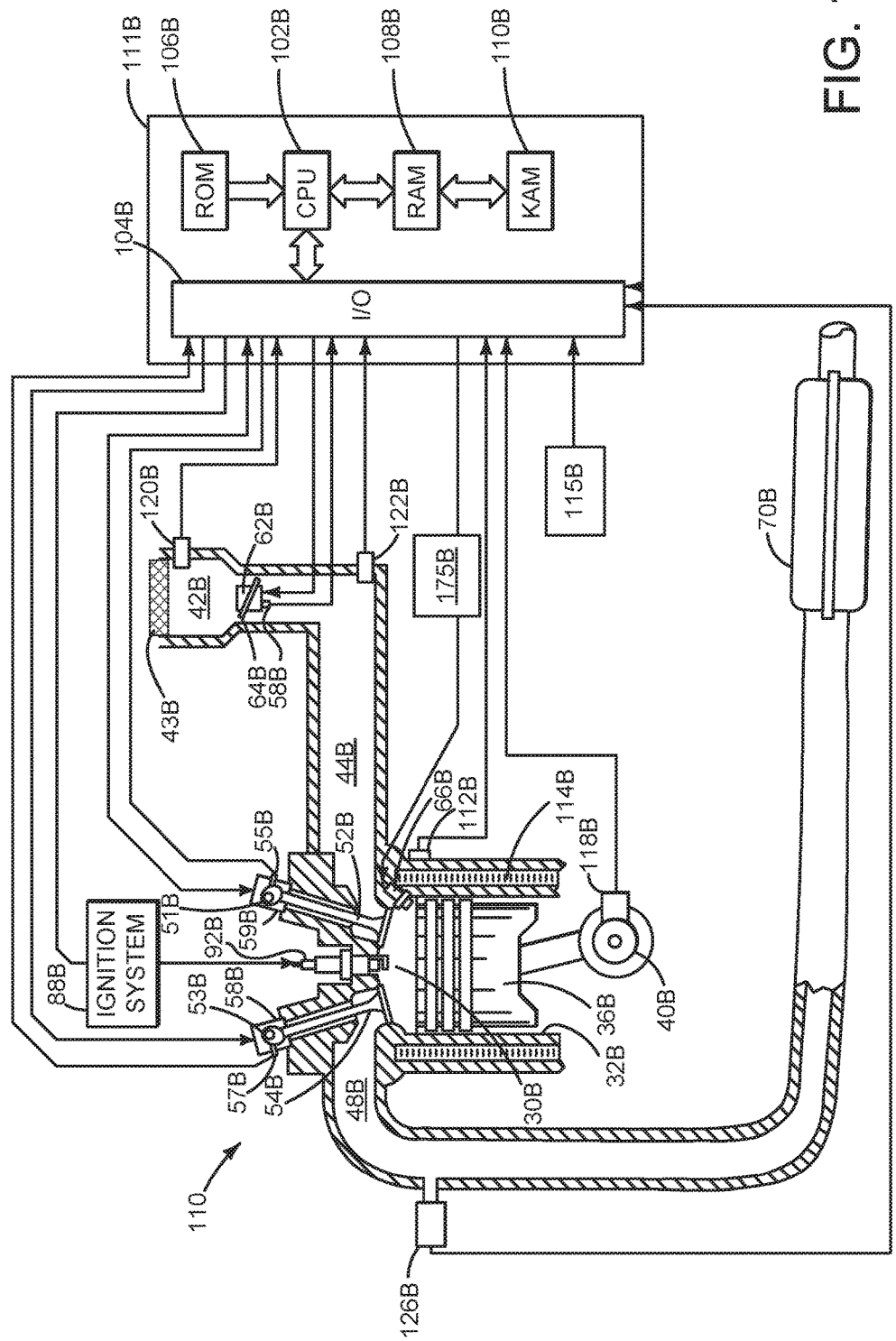
FIG. 1B is a sketch of an engine of the hybrid vehicle driveline.

Referring to FIG. 1B, a detailed view of internal combustion engine 110, comprising a plurality of cylinders, one cylinder of which is shown in FIG. 1B, is shown. Engine 110 is controlled by electronic engine controller 111B. Engine 110 includes combustion chamber 30B and cylinder walls 32B with piston 36B positioned therein and connected to crankshaft 40B. Combustion chamber 30B is shown communicating with intake manifold 44B and exhaust manifold 48B via respective intake valve 52B and exhaust valve 54B. Each intake and exhaust valve may be operated by an intake cam 51B and an exhaust cam 53B. The position of intake cam 51B may be determined by intake cam sensor 55B. The position of exhaust cam 53B may be determined by exhaust cam sensor 57B. Intake cam 51B and exhaust cam 53B may be moved relative to crankshaft 40B. Intake valves may be deactivated and held in a closed state via intake valve deactivating mechanism 59B. Exhaust valves may be deactivated and held in a closed state via exhaust valve deactivating mechanism 58B.

Fuel injector 66B is shown positioned to inject fuel directly into cylinder 30B, which is known to those skilled in the art as direct injection. Alternatively, fuel may be injected to an intake port, which is known to those skilled in the art as port injection. Fuel injector 66B delivers liquid fuel in proportion to the pulse width of signal from engine controller 111B. Fuel is delivered to fuel injector 66B by a fuel system 175B, which includes a tank and pump. In addition, intake manifold 44B is shown communicating with optional electronic throttle 62B (e.g., a butterfly valve) which adjusts a position of throttle plate 64B to control air flow from air filter 43B and air intake 42B to intake manifold 44B. Throttle 62B regulates air flow from air filter 43B in engine air intake 42B to intake manifold 44B. In some examples, throttle 62B and throttle plate 64B may be positioned between intake valve 52B and intake manifold 44B such that throttle 62B is a port throttle.

Distributorless ignition system 88B provides an ignition spark to combustion chamber 30B via spark plug 92B in response to engine controller 111B. Universal Exhaust Gas Oxygen (UEGO) sensor 126B is shown coupled to exhaust manifold 48B upstream of catalytic converter 70B in a direction of exhaust flow. Alternatively, a two-state exhaust gas oxygen sensor may be substituted for UEGO sensor 126B.

Converter 70B can include multiple catalyst bricks, in one example. In another example, multiple emission control devices, each with multiple bricks, can be used. Converter 70B can be a three-way type catalyst in one example.

Engine controller 111B is shown in FIG. 1B as a conventional microcomputer including: microprocessor unit 102B, input/output ports 104B, read-only memory 106B (e.g., non-transitory memory), random access memory 108B, keep alive memory 110B, and a conventional data bus. Other controllers mentioned herein may have a similar processor and memory configuration. Engine controller 111B is shown receiving various signals from sensors coupled to engine 110, in addition to those signals previously discussed, including: engine coolant temperature (ECT) from temperature sensor 112B coupled to cooling sleeve 114B; a measurement of engine manifold pressure (MAP) from pressure sensor 122B coupled to intake manifold 44B; an engine position sensor from a Hall effect sensor 118B sensing crankshaft 40B position; a measurement of air mass entering the engine from sensor 120B; and a measurement of throttle position from sensor 58B. Barometric pressure may also be sensed (sensor not shown) for processing by engine controller 111B. In a preferred aspect of the present description, engine position sensor 118B produces a predetermined number of equally spaced pulses every revolution of the crankshaft from which engine speed (RPM) can be determined. Engine controller 111B may receive input from human/machine interface 115B (e.g., pushbutton or touch screen display).

During operation, each cylinder within engine 110 typically undergoes a four stroke cycle: the cycle includes the intake stroke, compression stroke, expansion stroke, and exhaust stroke. During the intake stroke, generally, the exhaust valve 54B closes and intake valve 52B opens. Air is introduced into combustion chamber 30B via intake manifold 44B, and piston 36B moves to the bottom of the cylinder so as to increase the volume within combustion chamber 30B. The position at which piston 36B is near the bottom of the cylinder and at the end of its stroke (e.g. when combustion chamber 30B is at its largest volume) is typically referred to by those of skill in the art as bottom dead center (BDC). During the compression stroke, intake valve 52B and exhaust valve 54B are closed. Piston 36B moves toward the cylinder head so as to compress the air within combustion chamber 30B. The point at which piston 36B is at the end of its stroke and closest to the cylinder head (e.g. when combustion chamber 30B is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92B, resulting in combustion. During the expansion stroke, the expanding gases push piston 36B back to BDC. Crankshaft 40B converts piston movement into a rotational torque of the rotary shaft. Finally, during the exhaust stroke, the exhaust valve 54B opens to release the combusted air-fuel mixture to exhaust manifold 48B and the piston returns to TDC. Note that the above is shown merely as an example, and that intake and exhaust valve opening and/or closing timings may vary, such as to provide positive or negative valve overlap, late intake valve closing, or various other examples.

Figure 2:
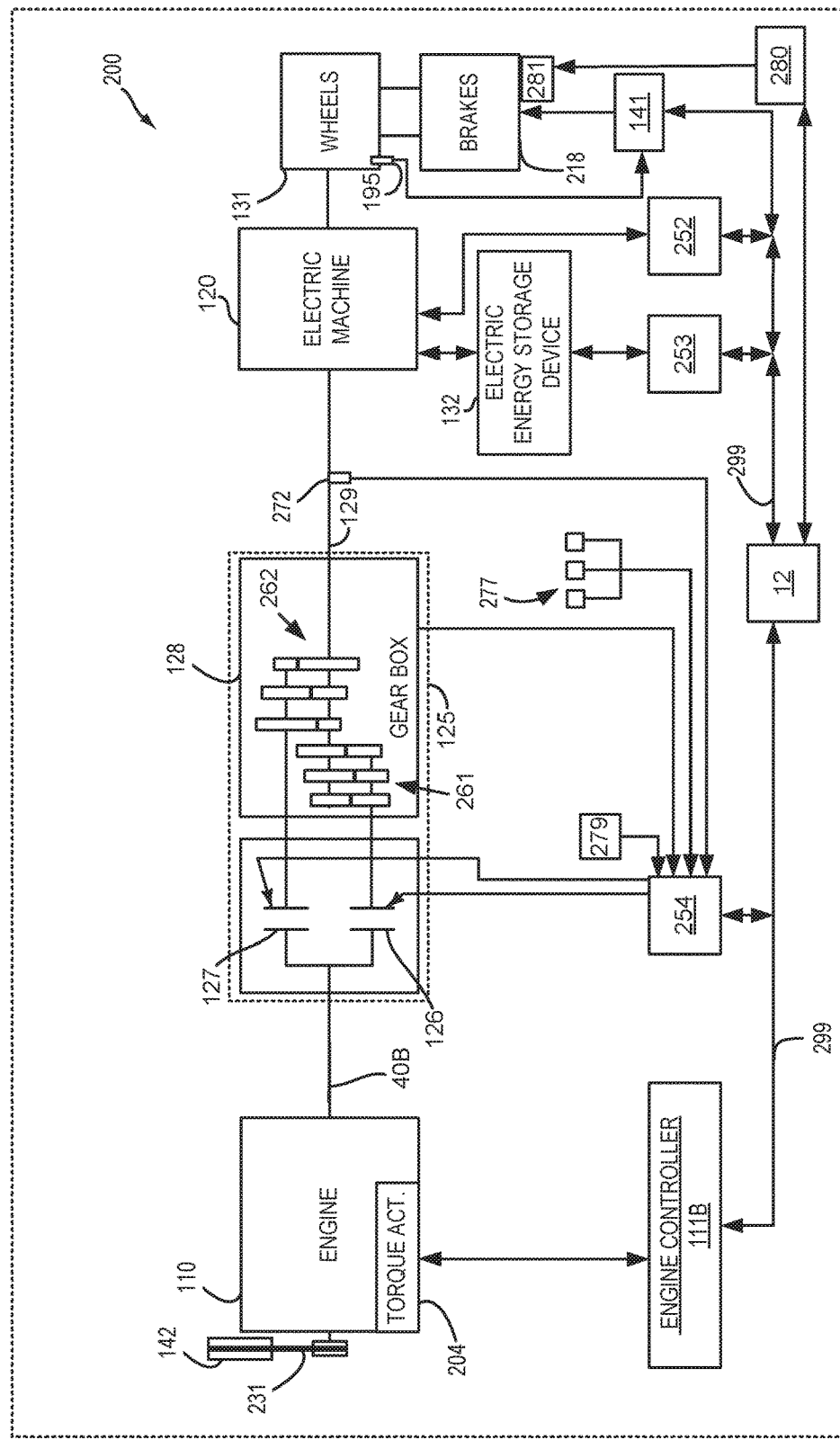
FIG. 2 is a schematic diagram of the hybrid vehicle driveline including controllers of various driveline components.

FIG. 2 is a block diagram of vehicle 121 including a powertrain or driveline 200. The powertrain of FIG. 2 includes engine 110 shown in FIG. 1A-1B. Other components of FIG. 2 that are common with FIG. 1A are indicated by like numerals, and will be discussed in detail below.

Powertrain 200 is shown including vehicle system controller 12, engine controller 111B, electric machine controller 252, transmission controller 254, energy storage device controller 253, and brake controller 141 (also referred to herein as brake system control module). The controllers may communicate over controller area network (CAN) 299. Each of the controllers may provide information to other controllers such as torque output limits (e.g. torque output of the device or component being controlled not to be exceeded), torque input limits (e.g. torque input of the device or component being controlled not to be exceeded), torque output of the device being controlled, sensor an actuator data, diagnostic information (e.g. information regarding a degraded transmission, information regarding a degraded engine, information regarding a degraded electric machine, information regarding degraded brakes). Further, the vehicle system controller 12 may provide commands to engine controller 111B, electric machine controller 252, transmission controller 254, and brake controller 141 to achieve driver input requests and other requests that are based on vehicle operating conditions.

For example, in response to a driver releasing an accelerator pedal and vehicle speed decreasing, vehicle system controller 12 may request a desired wheel torque or wheel power level to provide a desired rate of vehicle deceleration. The desired wheel torque may be provided by vehicle system controller 12 requesting a first braking torque from electric machine controller 252 and a second braking torque from brake controller 141, the first and second torques providing the desired braking torque at vehicle wheels 131.

In other examples, the partitioning of controlling powertrain devices may be partitioned differently than is illustrated in FIG. 2. For example, a single controller may take the place of vehicle system controller 12, engine controller 111B, electric machine controller 252, transmission controller 254, and brake controller 141. Alternatively, the vehicle system controller 12 and the engine controller 111B may be a single unit while the electric machine controller 252, the transmission controller 254, and the brake controller 141 may be standalone controllers.

In this example, powertrain 200 may be powered by engine 110 and electric machine 120. In other examples, engine 110 may be omitted. Engine 110 may be started with an engine starter (e.g. 140), via belt integrated starter/generator (BISG) 142, or via electric machine 120. In some examples, BISG may be coupled directly to the engine crankshaft at either end (e.g., front or back) of the crankshaft. Electric machine 120 (e.g. high voltage electric machine, operated with greater than 30 volts), is also referred to herein as electric machine, motor, and/or generator. Further, torque of engine 110 may be adjusted via a torque actuator 204, such as a fuel injector, throttle, etc.

BISG 142 is mechanically coupled to engine 110 via belt 231. BISG 142 may be coupled to a crankshaft (not shown). BISG 142 may operate as a motor when supplied with electrical power via electric energy storage device 132, also referred to herein as onboard energy storage device 132. BISG 142 may additionally operate as a generator supplying electrical power to electric energy storage device 132.

Driveline 200 includes engine 110 mechanically coupled to dual clutch transmission (DCT) 125 via crank shaft 40B. DCT 125 includes a first clutch 126, a second clutch 127, and a gear box 128. DCT 125 outputs torque to shaft 129, to supply torque to vehicle wheels 131. Transmission controller 254 selectively opens and closes first clutch 126 and second clutch 127 to shift DCT 125.

Gear box 128 may include a plurality of gears. One clutch, for example first clutch 126 may control odd gears 261 (e.g. first, third, fifth, and reverse), while another clutch, for example second clutch 127, may control even gears 262 (e.g. second, fourth, and sixth). By utilizing such an arrangement, gears can be changed without interrupting power flow from the engine 110 to dual clutch transmission 125.

Electric machine 120 may be operated to provide torque to powertrain 200 or to convert powertrain torque into electrical energy to be stored in electrical energy storage device 132 in a regeneration mode. Additionally, electric machine 120 may convert the vehicle's kinetic energy into electrical energy for storage in electric energy storage device 132. Electric machine 120 is in electrical communication with energy storage device 132. Electric machine 120 has a higher output torque capacity than starter (e.g. 140) depicted in FIG. 1A, or BISG 142. Further, electric machine 120 directly drives powertrain 200, or is directly driven by powertrain 200.

Electrical energy storage device 132 (e.g. high voltage battery or power source) may be a battery, capacitor, or inductor. Electric machine 120 is mechanically coupled to wheels 131 and dual clutch transmission via a gear set in rear drive unit 136 (shown in FIG. 1A). Electric machine 120 may provide a positive torque or a negative torque to powertrain 200 via operating as a motor or generator as instructed by electric machine controller 252.

Further, a frictional force may be applied to wheels 131 by engaging friction wheel brakes 218. In one example, friction wheel brakes 218 may be engaged in response to the driver pressing his foot on a brake pedal (e.g. 192) and/or in response to instructions within brake controller 141. Further, brake controller 141 may apply brakes 218 in response to information and/or requests made by vehicle system controller 12. In the same way, a frictional force may be reduced to wheels 131 by disengaging wheel brakes 218 in response to the driver releasing his foot from a brake pedal, brake controller instructions, and/or vehicle system controller instructions and/or information. For example, vehicle brakes may apply a frictional force to wheels 131 via controller 141 as part of an automated engine stopping procedure.

Vehicle system controller 12 may also communicate vehicle suspension settings to suspension controller 280. The suspension (e.g. 111) of vehicle 121 may be adjusted to critically damp, over damp, or under damp the vehicle suspension via variable dampeners 281.

Accordingly, torque control of the various powertrain components may be supervised by vehicle system controller 12 with local torque control for the engine 110, transmission 125, electric machine 120, and brakes 218 provided via engine controller 111B, electric machine controller 252, transmission controller 254, and brake controller 141.

As one example, an engine torque output may be controlled by adjusting a combination of spark timing, fuel pulse width, fuel pulse timing, and/or air charge, by controlling throttle (e.g. 62B) opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from electric machine 120 by adjusting current flowing to and from field and/or armature windings of electric machine 120 as is known in the art.

Transmission controller 254 may receive transmission output shaft torque from torque sensor 272. Alternatively, sensor 272 may be a position sensor or torque and position sensors. If sensor 272 is a position sensor, transmission controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 111B, and vehicle system controller 12, may also receive additional transmission information from sensors 277, which may include but are not limited to pump output line pressure sensors, transmission hydraulic pressure sensors (e.g., gear clutch fluid pressure sensors), motor temperature sensors, BISG temperatures, shift selector position sensors, synchronizer position sensors, and ambient temperature sensors. Transmission controller may also receive a requested transmission state (e.g., requested gear or park mode) from shift selector 279, which may be a lever, switches, or other device.

Brake controller 141 receives wheel speed information via wheel speed sensor 195 and braking requests from vehicle system controller 12. Brake controller 141 may also receive brake pedal position information from brake pedal sensor (e.g. 157) shown in FIG. 1A directly or over CAN 299. Brake controller 141 may provide braking responsive to a wheel torque command from vehicle system controller 12. Brake controller 141 may also provide anti-lock and vehicle stability braking to improve vehicle braking and stability. As such, brake controller 141 may provide a wheel torque limit (e.g., a threshold negative wheel torque not to be exceeded) to the vehicle system controller 12 so that negative motor torque does not cause the wheel torque limit to be exceeded. For example, if controller 12 issues a negative wheel torque limit of 50 N-m, motor torque may be adjusted to provide less than 50 N-m (e.g., 49 N-m) of negative torque at the wheels, including compensating for transmission gearing.

Positive torque may be transmitted to vehicle wheels 131 in a direction starting at engine 110 and ending at wheels 131. Thus, according to the direction of positive torque flow in driveline 200, engine 110 is positioned in driveline 200 upstream of transmission 125. Transmission 125 is positioned upstream of electric machine 120, and BISG 142 may be positioned upstream of engine 110, or downstream of engine 110 and upstream of transmission 125.

Figure 3:
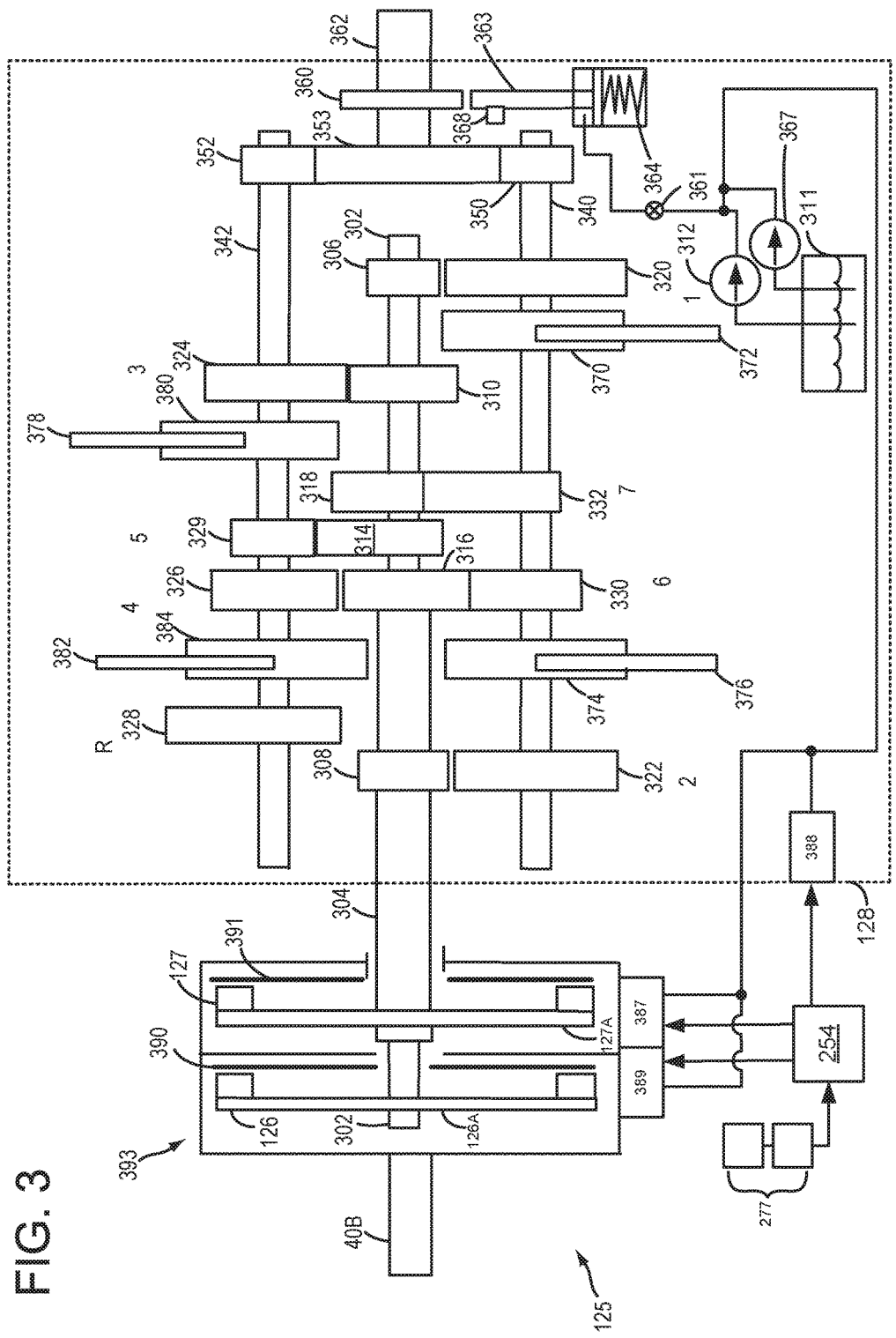
FIG. 3 is a schematic diagram of a dual clutch transmission located in the hybrid vehicle driveline.

FIG. 3 shows a detailed illustration of a dual clutch transmission (DCT) 125. Engine crankshaft 40B is illustrated as coupling to a clutch housing 393. Alternatively, a shaft may couple crankshaft 40B to clutch housing 393. Clutch housing 393 may spin in accordance with rotation of crankshaft 40B. Clutch housing 393 may include a first clutch 126 and a second clutch 127. Furthermore, each of first clutch 126 and second clutch 127 have an associated first clutch plate 390, and a second clutch plate 391, respectively. In some examples, the clutches may comprise wet clutches, bathed in oil (for cooling), or dry plate clutches. Engine torque may be transferred from clutch housing 393 to either first clutch 126 or second clutch 127. First transmission clutch 126 transfers torque between engine 110 (shown in FIG. 1A) and first transmission input shaft 302. As such, clutch housing 393 may be referred to as an input side of first transmission clutch 126 and 126A may be referred to as an output side of first transmission clutch 126. Second transmission clutch 127 transfers torque between engine 110 (shown in FIG. 1A) and second transmission input shaft 304. As such, clutch housing 393 may be referred to as an input side of second transmission clutch 127 and 127A may be referred to as an output side of second transmission clutch 127.

A gear box 128 may include a plurality of gears, as discussed above. There are two transmission input shafts, including first transmission input shaft 302, and second transmission input shaft 304. Second transmission input shaft 304 is hollow, while first transmission input shaft 302 is solid, and sits coaxially within the second transmission input shaft 304. As an example, first transmission input shaft 302 may have a plurality of fixed gears. For example, first transmission input shaft 302 may include first fixed gear 306 for receiving first gear 320, third fixed gear 310 for receiving third gear 324, fifth fixed gear 314 for receiving fifth gear 329, and seventh fixed gear 318 for receiving seventh gear 332. In other words, first transmission input shaft 302 may be selectively coupled to a plurality of odd gears. Second transmission input shaft 304 may include second fixed gear 308 for receiving second gear 322, or a reverse gear 328, and may further include fourth fixed gear 316, for receiving either fourth gear 326 or sixth gear 330. It may be understood that both first transmission input shaft 302 and second transmission input shaft 304 may be connected to each of first clutch 126 and second clutch 127 via spines (not shown) on the outside of each shaft, respectively. In a normal resting state, each of first clutch 302 and second clutch 304 are held open, for example via springs (not shown), etc., such that no torque from engine (e.g. 110) may be transmitted to first transmission input shaft 302 or second transmission input shaft 304 when each of the respective clutches are in an open state. Responsive to closing first clutch 126, engine torque may be transmitted to first transmission input shaft 302, and responsive to closing second clutch 127, engine torque may be transmitted to second transmission input shaft 304. During normal operation, transmission electronics may ensure that only one clutch is closed at any given time.

Gear box 128 may further include a first layshaft shaft 340, and second layshaft shaft 342. Gears on first layshaft shaft 340 and second layshaft shaft 342 are not fixed, but may freely rotate. In example DCT 125, first layshaft shaft 340 includes first gear 320, second gear 322, sixth gear 330, and seventh gear 332. Second layshaft 342 includes third gear 324, fourth gear 326, fifth gear 329, and reverse gear 328. Both first layshaft shaft 340 and second layshaft shaft 342 may transfer torque via a first output pinion 350, and a second output pinion 352, respectively, to gear 353. In this way, both layshafts may transfer torque via each of first output pinion 350 and second output pinion 352, to output shaft 362, where output shaft may transfer torque to a rear drive unit 136 (shown in FIG. 1A) which may enable each of the driven wheels (e.g. 131 of FIG. 1A) to rotate at different speeds, for example when performing turning maneuvers.

As discussed above, each of first gear 320, second gear 322, third gear 324, fourth gear 326, fifth gear 329, sixth gear 330, seventh gear 332, and reverse gear 328 are not fixed to layshafts (e.g. 340 and 342), but instead may freely rotate. As such, synchronizers may be utilized to enable each of the gears to match the speed of the layshafts, and may further be utilized to lock the gears. In example DCT 125, four synchronizers are illustrated, for example, first synchronizer 370, second synchronizer 374, third synchronizer 380, and fourth synchronizer 382. First synchronizer 370 includes corresponding first selector fork 372, second synchronizer 374 includes corresponding selector fork 376, third synchronizer 380 includes corresponding third selector fork 378, and fourth synchronizer 384 includes corresponding fourth selector fork 382. Each of the selector forks may enable movement of each corresponding synchronizer to lock one or more gears, or to unlock one or more gears. For example, first synchronizer 370 may be utilized to lock either first gear 320 or seventh gear 332. Second synchronizer 374 may be utilized to lock either second gear 322 or sixth gear 330. Third synchronizer 380 may be utilized to lock either third gear 324 or fifth gear 329. Fourth synchronizer 384 may be utilized to lock either fifth gear 326, or reverse gear 328. In each case, movement of the synchronizers may be accomplished via the selector forks (e.g. 372, 376, 378, and 382) moving each of the respective synchronizers to the desired position.

Movement of synchronizers via selector forks may be carried out via transmission control module (TCM) 254 and shift fork actuators 388, where TCM 254 may comprise TCM 254 discussed above with regard to FIG. 2. Shift fork actuators may be operated electrically, hydraulically, or a combination of electric and hydraulic. Hydraulic power may be provided via pump 312 and/or pump 367. TCM 254 may collect input signals from various sensors, assess the input, and control various actuators accordingly. Inputs utilized by TCM 254 may include but are not limited to transmission range (P/R/N/D/S/L, etc.), vehicle speed, engine speed and torque, throttle position, engine temperature, ambient temperature, steering angle, brake inputs, gear box input shaft speed (for both first transmission input shaft 302 and second transmission input shaft 304), vehicle attitude (tilt). The TCM may control actuators via an open-loop control, to allow for adaptive control. For example, adaptive control may enable TCM 254 to identify and adapt to clutch engagement points, clutch friction coefficients, and position of synchronizer assemblies. TCM 254 may also adjust first clutch actuator 389 and second clutch actuator 387 to open and close first clutch 126 and second clutch 127. First clutch actuator 389 and second clutch actuator 387 may be operated electrically, hydraulically, or a combination of electric and hydraulic. Hydraulic power may be provided via pump 312 and/or pump 367.

As such TCM 254 is illustrated as receiving input from various sensors 277. As discussed above with regard to FIG. 2, the various sensors may include pump output line pressure sensors, transmission hydraulic pressure sensors (e.g. gear clutch fluid pressure sensors), motor temperature sensors, shifter position sensors, synchronizer position sensors, and ambient temperature sensors. The various sensors 277 may further include wheel speed sensors (e.g. 195), engine speed sensors, engine torque sensors, throttle position sensors, engine temperature sensors, steering angle sensors, and inertial sensors (e.g. 199). Inertial sensors may comprise one or more of the following: longitudinal, latitudinal, vertical, yaw, roll, and pitch sensors, as discussed above with regard to FIG. 1A.

Sensors 277 may further include an input shaft speed (ISS) sensor, which may include a magneto-resistive sensor, and where one ISS sensor may be included for each gear box input shaft (e.g. one for first transmission input shaft 302 and one for second transmission input shaft 304). Sensors 277 may further include an output shaft speed sensor (OSS), which may include a magneto-resistive sensor, and may be attached to output shaft 362. Sensors 277 may further include a transmission range (TR) sensor and shift fork position sensors to detect position of selector forks (e.g. 372, 376, 378, 382).

DCT 125 may be understood to function as described herein. For example, when first clutch 126 is actuated closed, engine torque may be supplied to first transmission input shaft 302. When first clutch 126 is closed, it may be understood that second clutch 127 is open, and vice versa. Depending on which gear is locked when first clutch 126 is closed, power may be transmitted via the first transmission input shaft 302 to either first layshaft 340 or second layshaft 342, and may be further transmitted to output shaft 362 via either first pinion gear 350 or second pinion gear 352. Alternatively, when second clutch 127 is closed, power may be transmitted via the second transmission input shaft 304 to either first layshaft 340 or second layshaft 342, depending on which gear is locked, and may be further transmitted to output shaft 362 via either first pinion gear 350 or second pinion gear 352. It may be understood that when torque is being transferred to one layshaft (e.g. first output shaft 340), the other layshaft (e.g. second output shaft 342) may continue to rotate even though only the one shaft is driven directly by the input. More specifically, the non-engaged shaft (e.g. second layshaft 342) may continue to rotate as it is driven indirectly by the output shaft 362 and respective pinion gear (e.g. 352).

DCT 125 may enable preselection of gears, which may thus enable rapid switching between gears with minimal loss of torque during shifting. As an example, when first gear 320 is locked via first synchronizer 340, and wherein first clutch 126 is closed (and second clutch 127 is open), power may be transmitted from the engine to first input shaft 302, and to first layshaft 340. While first gear 320 is engaged, second gear 322 may simultaneously be locked via second synchronizer 374. Because second gear 322 is locked, this may rotate second input shaft 304, where the second input shaft 304 is speed matched to the vehicle speed in second gear. In an alternative case where a gear is pre-selected on the other layshaft (e.g. second layshaft 342), that layshaft will also rotate as it is driven by output shaft 362 and pinion 352.

When a gear shift is initiated by TCM 254, only the clutches need to be actuated to open first clutch 126 and close second clutch 127. Furthermore, outside the TCM, engine speed may be lowered to match the upshift. With the second clutch 127 closed, power may be transmitted from the engine, to second input shaft 304, and to first layshaft 340, and may be further transmitted to output shaft 362 via pinion 350. Subsequent to the shifting of gears being completed, TCM 254 may pre-select the next gear appropriately. For example, TCM 254 may pre-select either a higher or a lower gear, based on input it receives from various sensors 277. In this way, gear changes may be achieved rapidly with minimal loss of engine torque provided to the output shaft 362.

Dual clutch transmission 300 may in some examples include a parking gear 360. A parking pawl 363 may face parking gear 360. When a shift lever is set to park, park pawl 363 may engage parking gear 360. Engagement of parking pawl 363 with parking gear 360 may be accomplished via a parking pawl spring 364, or may be achieved via a cable (not shown), a hydraulic piston (not shown) or a motor (not shown), for example. When parking pawl 363 is engaged with parking gear 360, driving wheels (e.g. 130, 131) of a vehicle may be locked. On the other hand, responsive to the shift lever being moved from park, to another selection (e.g. drive), parking pawl 363 may move such that parking pawl 363 may be disengaged from parking gear 360.

In some examples, an electric transmission pump 312 may supply hydraulic fluid from transmission sump 311 to compress spring 364, in order to release parking pawl 363 from parking gear 360. Electric transmission pump 312 may be powered by an onboard energy storage device (e.g. 132), for example. In some examples, a mechanical pump 367 may additionally or alternatively supply hydraulic fluid from transmission sump 311 to compress spring 364 to release parking pawl 363 from parking gear 360. While not explicitly illustrated, mechanical pump may be driven by the engine (e.g. 110), and may be mechanically coupled to clutch housing 393. A park pawl valve 361 may regulate the flow of hydraulic fluid to spring 364, in some examples.

Thus, the system of FIGS. 1A-3 provides for a system, comprising: an engine; a transmission including a first input clutch, a second input clutch, a first input shaft and a second input shaft, a first layshaft selectively coupled to the first input shaft, a second layshaft selectively coupled to the second input shaft, a plurality of gears, and an output shaft coupled to the first and second layshafts; a rear drive unit including a rear axle and an electric machine coupled to the dual clutch transmission via a driveshaft; and a controller including executable instructions stored in non-transitory memory to stop rotation of the engine in response to an engine stop request and lock a first gear of the plurality of gears to the first layshaft or the second layshaft in response to first vehicle speed and first demand torque.

In some examples, the system further comprises additional instructions to unlock the first gear from the first layshaft or the second layshaft and lock a second gear of the plurality of gears to the first layshaft or the second layshaft in response to a second vehicle speed and a second demand torque. The system further comprises additional instructions to open or hold open the first input clutch and the second input clutch in response to the engine stop request. The system includes where the first gear is locked to the first layshaft or the second layshaft without transferring torque between the engine and wheels of a vehicle. The system further comprises an electric transmission pump and additional instructions to activate the electric transmission pump in response to the engine stop request. The system further comprises additional instructions to start the engine and deactivate the electric transmission pump after starting the engine in response to an engine start request.

Turning to FIG. 4, a prophetic hybrid vehicle driveline operating sequence is shown. The operating sequence of FIG. 4 may be provided via the system of FIGS. 1A-3 in cooperation with the method of FIG. 5. The plots shown in FIG. 4 occur at the same time and are aligned in time.

The first plot from the top of FIG. 4 is a plot of engine operating state versus time. The vertical axis represents engine operating state and engine operating state may be on (e.g., combusting air and fuel) or off (e.g., decelerating the engine to zero rotational speed or engine rotational speed being zero and not combusting air and fuel). The horizontal axis represents time and time increases from the left side of the figure to the right side of the figure.

The second plot from the top of FIG. 4 is a plot of transmission input shaft clutch (e.g., input clutch 126 or 127 of FIG. 3) states versus time for first input clutch 126 and second input clutch 127. Trace 404 represents the operating state of the second transmission input clutch. The second input shaft clutch 127 is closed when solid trace 404 is at a higher level near the vertical axis arrow. The second input shaft clutch 127 is open when the solid trace 404 is at a lower level near the horizontal axis or not visible. Trace 406 represents the operating state of the first transmission input clutch. The first input shaft clutch 126 is closed when dashed trace 406 is at a higher level near the vertical axis arrow. The first input shaft clutch 126 is open when the dashed trace 406 is at a lower level near the horizontal axis or not visible. The horizontal axis represents time and time increases from the left side of the figure to the right side of the figure.

The third plot from the top of FIG. 4 is a plot of pre-select gear versus time. The vertical axis represents pre-selected gear. A pre-selected gear may be a forecast next desired gear (e.g., the gear that next becomes the desired gear) and the pre-selected gear is locked to a layshaft but a transmission input clutch associated with the layshaft is held open. For example, if the desired transmission gear is fourth gear and the vehicle is accelerating, the pre-select gear may be fifth gear so that changing the desired gear from fourth gear to fifth gear is short in duration. On the other hand, if the desired gear is fourth gear and the vehicle is decelerating, the pre-select gear may be third gear so that changing the desired gear from fourth gear to third gear may be performed in a short period of time. The horizontal axis represents time and time increases from the left side of the figure to the right side of the figure.

The fourth plot from the top of FIG. 4 is a plot of desired transmission gear versus time. The vertical axis represents desired transmission gear. The desired transmission gear may be a gear that is selected and locked to a layshaft in response to vehicle speed and driver demand torque (e.g., a desired torque at the wheels or a location along the length of the driveline or powertrain). The desired gear is frequently a gear through which engine torque is delivered to vehicle wheels. However, when the desired gear changes from a first gear to a second gear during a shift, the desired gear may not transfer engine torque to the wheels for a short period of time. The desired gear may change to a gear that was previously the pre-selected gear when a gear shift is performed so that the pre-selected gear becomes the desired gear and the pre-selected gear changes to a new different gear. For example, if a vehicle is accelerating and $2^{nd}$ gear is engaged and is the desired gear while $3^{rd}$ gear is the pre-selected gear, the desired gear may change to $3^{rd}$ gear and the pre-selected gear may change from $3^{rd}$ gear to $4^{th}$ gear during a gear shift. The horizontal axis represents time and time increases from the left side of the figure to the right side of the figure.

The fifth plot from the top of FIG. 4 is a plot of electric pump operating state versus time. The vertical axis represents electric pump operating state and the electric pump is operating and supplying fluid to transmission components (e.g., input clutch actuators and shift fork actuators) when the trace is at a higher level near the vertical axis arrow. The electric pump is not operating and it is not delivering fluid to transmission components when the trace is at a lower level or not visible. The horizontal axis represents time and time increases from the left side of the figure to the right side of the figure.

The sixth plot from the top of FIG. 4 is a plot of driveline efficiency/responsiveness mode state versus time. The vertical axis represents driveline efficiency/responsiveness mode state and the driveline is in a responsive mode when the trace is near the vertical axis arrow. The driveline is in an efficiency mode when the trace is near the horizontal axis or not shown. Operating the driveline in the responsiveness mode may reduce shift time and time to engage an engine to vehicle wheels when the engine is restarted. Operating the driveline in an efficiency mode may improve efficiency of converting the vehicle's kinetic energy into electrical energy via an electric machine in the driveline. The horizontal axis represents time and time increases from the left side of the figure to the right side of the figure.

At time T0, the engine is rotating and combusting air and fuel. Trace 404 indicates that the second input clutch is closed so that the engine is couple to the vehicle wheels. Fifth gear is pre-selected because the vehicle is decelerating (not shown) and the desired gear is sixth gear. Sixth gear is engaged and torque may be transferred between the engine and vehicle wheels via sixth gear. The electric transmission pump is not activated, but since the engine is activated a mechanical pump is supplying fluid to transmission components. The driveline is in a responsive mode so that shift time and engine torque to wheels may be reduced. The driveline may enter a responsive mode if the vehicle is in a sport mode. The driveline may enter an efficiency mode if the vehicle is not in sport mode.

At time T1, a request to stop the engine is issued (not shown) and the engine decelerates to zero rotational speed. The engine stop request may be made via a controller in response to vehicle operating conditions. Trace 404 indicates that the second input shaft clutch is opened in response to the request to stop engine rotation so that the engine may reach zero rotational speed without affecting vehicle speed. The pre-selected gear remains fifth gear and the desired gear remains sixth gear. Thus, fifth gear is locked to a layshaft (e.g., 342) and sixth gear is locked to a layshaft (e.g., 340). The electric transmission pump is activated in response to the request to stop engine rotation and the driveline remains in responsive mode.

Between time T1 and time T2, the vehicle decelerates (not shown) and the pre-selected gear is adjusted or changed in response to vehicle speed and demand torque (e.g., demanded wheel torque). In this example, the demanded torque is low so the vehicle decelerates and the pre-selected gear is downshifted or moved down a gear several times until it reaches first gear. Similarly, the desired gear is adjusted down or changed in response to vehicle speed and demand torque; however, the desired gear follows the pre-selected gear such that the pre-selected gear changes to a lower gear than the desired gear each time the desired gear downshifts. The pre-selected gear successively downshifts from fifth gear to first gear and the desired gear successively downshifts from sixth gear to second gear. The electric pump is activated so that the synchronizers that lock the desired gear and the pre-selected gear to their respective layshafts may be moved via shift forks. The driveline remains in a responsive mode and the first and second input clutches are open so that the engine is decoupled from the vehicle wheels and the transmission input shafts (not shown).

The pre-selected gear and the desired gear are locked to different layshafts when the pre-selected gear trace and the desired gear trace are visible. Because the pre-selected gear is locked to a layshaft and because the desired gear is locked to a layshaft via synchronizers (e.g., when the pre-select gear trace and the desired gear trace are visible), the first and second input shafts rotate at speeds that are a gear multiple of the transmission output shaft speed (not shown). The transmission's gears are not locked to layshafts in the transmission and the gears rotate freely about the layshafts when pre-selected gear trace and the desired gear trace are not visible.

At time T2, the engine is requested to start (not shown) and the engine is started and accelerated to a speed of an input shaft corresponding to the desired gear. In this example, the desired gear is second gear so the engine is accelerated to a speed of second transmission shaft 304 (not shown) and then the second transmission input clutch 127 is closed. Torque may be transferred between vehicle wheels and the engine when input clutch 127 is closed. The desired gear is second gear based on vehicle speed and demand torque. The pre-selected gear is changed from first gear to third gear since the engine is restarted and demand torque is increasing (not shown). The electric pump is stopped in response to the engine starting since the engine rotates a mechanical pump in the transmission, thereby allowing fluid to be pumped to transmission components and actuators. The driveline remains in a responsive mode.

Between time T2 and time T3, the engine remains combusting air and fuel and the vehicle accelerates (not shown). The first and second input clutches are opened and closed several times in response to the increasing vehicle speed so that the desired gear may be engaged. The pre-selected gear changes successively from third gear to seventh gear as time increases and each gear is locked when it is the pre-selected gear and the locked pre-selected gear is unlocked when the pre-selected gear changes. The desired gear changes successively from second gear to sixth gear as time increases and each gear is locked when it is the desired gear and the locked desired gear is unlocked when the desired gear changes. The electric transmission pump remains off and the driveline changes from responsive mode to efficiency mode.

At time T3, a request to stop the engine is issued (not shown) and the engine decelerates to zero rotational speed. The second input shaft clutch 127 is opened in response to the request to stop engine rotation so that the engine may reach zero rotational speed without affecting vehicle speed. The pre-selected gear and the desired gear are not indicated because no gears are locked to layshafts (e.g., 340 and 342) since the driveline is in efficiency mode. In efficiency mode, the first and second input shafts are decoupled from the output shaft and the engine so that they may decrease to zero speed and not consume the vehicle's kinetic energy if the vehicle is moving and decelerating. Further, if the electric machine is propelling the vehicle, the first and second transmission input shafts are not rotated by the electric machine so that the electric machine rotates less mass and conserves electrical energy. The electric pump is off since the synchronizers are not being used to lock gears to the layshafts or operate the first and second input clutches. Thus, additional electrical energy is not consumed via the electric transmission pump.

Between time T3 and time T4, the vehicle may decelerate and provide electrical energy via converting the vehicle's kinetic energy into electrical energy via the electric machine in the rear drive unit (not shown). The transmission gears rotate about the transmission lay shafts and the transmission input clutches are open so that transmission input shafts do not rotate or transfer torque between the vehicle wheels and the engine.

At time T4, the engine is requested to start (not shown) and the engine is started and accelerated to a speed of an input shaft corresponding to the desired gear. The electric pump remains stopped and a mechanical pump in the transmission starts rotating so that the input clutches may be closed. In this example, the desired gear is second gear so the engine is accelerated to a speed of second transmission shaft 304 (not shown) and then the second transmission input clutch 127 is closed. Torque may be transferred between vehicle wheels and the engine when input clutch 127 is closed. The desired gear is second gear based on vehicle speed and demand torque. The pre-selected gear changes from an unlocked state to being the third gear since the engine is restarted and demand torque is increasing (not shown). The driveline remains in an efficiency mode.

In this way, gears of a transmission may be locked layshafts or unlocked from layshafts while an engine coupled to the transmission is not rotating so that energy efficiency may be improved or so that driveline responsiveness may be improved. Further, the gears that are locked to the layshafts may be changes so that if an engine start is requested, torque transfer from the engine to the wheels may be hastened.

Referring now to FIG. 5, a flowchart of a method for controlling a vehicle driveline is shown. The method of FIG. 5 may be incorporated into and may cooperate with the system of FIGS. 1A-3. Further, at least portions of the method of FIG. 5 may be incorporated as executable instructions stored in non-transitory memory while other portions of the method may be performed via a controller transforming operating states of devices and actuators in the physical world.

At 502, method 500 judges if an engine stop (e.g. no engine rotation) is requested. An engine stop request may be made via an operator or a controller. The controller may base a decision to stop engine rotation based on vehicle conditions such as driver demand torque and vehicle speed. Driver demand torque may be determined via a position of an accelerator pedal or via a controller (e.g., for autonomous vehicles or vehicles operating in a speed control mode) and the driver demand torque may be a desired wheel torque or torque at a location along the driveline (e.g., axle torque). If method 500 judges that there is a request to stop engine rotation or if the engine is already stopped, the answer is yes and method 500 proceeds to 504. Otherwise, the answer is no and method 500 proceeds to 550.

At 550, method 500 shifts transmission gears in response to vehicle speed and driver demand torque. The transmission is shifted via opening and closing two input clutches (e.g., 126 and 126 of FIG. 3) and locking gears to layshafts. Method 500 proceeds to exit after shifting the transmission is performed.

At 504, method 500 judges if the driveline is operating in an efficiency mode or if the efficiency mode has higher priority than a responsiveness mode. A human driver or vehicle occupant may choose the driveline operating mode via a human/machine interface. If method 500 judges that the driveline is operating in an efficiency mode, the answer is yes and method 500 proceeds to 530. Otherwise, the answer is no and method 500 proceeds to 506.

At 530, method 500 opens transmission input clutches (e.g., 126 and 127 in FIG. 3). If one or more of the input clutches is already open, it is held open. The transmission input clutch are opened or held open so that the engine may be decoupled from vehicle wheels and the transmission input shafts (e.g., 302 and 304 of FIG. 3). By decoupling the engine from the vehicle wheels and transmission input shafts, the engine may stop rotating without affecting vehicle speed. Method 500 proceeds to 532.

At 532, method 500 disengages all synchronizers from gears so that the gears are unlocked from layshafts. The synchronizers are moved before engine rotation stops so that transmission fluid pumped by the engine may be used to disengage the synchronizers from any transmission gears that may be locked to layshafts. Disengaging the synchronizers allows the transmission input shafts to be decoupled from the layshafts so that speeds of the input shafts may be reduced to zero. In this way, the input shafts do not rotate at a gear ratio multiple of transmission output shaft speed. For example, if before the synchronizers were unlocked the input shaft was rotating at a speed of 2000 RPM and the transmission output shaft speed was 2000 RPM (a 1:1 gear ratio multiple), the input shaft speed may decrease toward zero speed and not be a gear ratio multiple of the transmission output shaft speed after the transmission synchronizer is unlocked. The gears rotate freely about the layshafts when the synchronizers are not locking the gears to the layshafts.

As such, the vehicle's kinetic energy is not used to rotate the transmission input shafts, thereby conserving the vehicle's kinetic energy. Additionally, if the rear drive unit is propelling the vehicle, the transmission input shafts are not rotated so that the electric machine output may be reduced. Thus, masses of the transmission are not rotated unnecessarily so that energy may be conserved. The synchronizers may be disengaged while a vehicle is traveling on a road at a non-zero speed. Method 500 proceeds to 534.

At 534, method 500 judges if engine reactivation (e.g., starting combustion in engine cylinders) is requested. Engine reactivation may be requested via a human or autonomous driver requesting torque, a low state of battery charge, or other vehicle conditions. If method 500 judges that engine reactivation is requested, the answer is yes and method 500 proceeds to 536. Otherwise, the answer is no and method 500 returns to 534.

At 536, method 500 locks a transmission gear to a layshaft in response to vehicle speed and driver demand torque. The gear that is locked may be a desired gear. Further, the gear that is locked may be determined via a shift schedule that is stored in controller memory, vehicle speed and driver demand torque are inputs to a function that outputs a desired gear and the desired gear is locked to a layshaft. The desired gear is locked to a layshaft so that when the engine is coupled to the transmission input shaft, the engine speed and the transmission input shaft speed may be matched to the present vehicle speed. Method 500 proceeds to 538 after locking the gear to the layshaft.

At 538, method 500 starts the engine and accelerates the engine to a speed of the first transmission input shaft (e.g., 302 of FIG. 3) or a speed of the second transmission input shaft (e.g., 304 of FIG. 3) associated with the locked or desired gear. For example, if the second gear (e.g., 322 of FIG. 3) is locked to layshaft 340, engine speed is accelerated to a speed of the second transmission input shaft (e.g., 304 of FIG. 3). Engine torque may not be transferred to the first and second transmission input shafts while the engine is accelerating since the first and second transmission clutches may be open. Accelerating the engine speed to the transmission input shaft speed may reduce torque disturbances in the driveline when one of the transmission input clutches is closed to couple the engine to one of the transmission input shafts.

The engine may be started via a starter motor before the transmission input shaft is closed. However, in alternative examples, the engine may be started via closing the transmission input shaft and using torque from the rear drive unit electric machine or from vehicle wheels to rotate and start the engine. Method 500 proceeds to 540.

At 540, method 500 closes a transmission input clutch associated with the locked gear in response to engine speed substantially equaling (e.g., with ±200 RPM) a speed of a transmission input shaft. For example, if the locked gear is second gear, the second transmission input clutch 127 is closed while the first transmission input clutch 126 is held open. By closing the second transmission input clutch 127, engine torque may be transferred through second gear to vehicle wheels. Alternatively, wheel torque or rear drive unit electric machine torque may be transferred to the engine in cases where the engine is started via wheel torque or electric machine torque. Method 500 proceeds to exit.

At 506, method 500 starts the transmission's electric pump and the electric pump supplies fluid to the transmission input clutch, fork actuators, and other devices and locations throughout the transmission. Method 500 proceeds to 508 after the electric pump is activated.

At 508, method 500 opens the first and second transmission input clutches. If one of the clutches is open, it is held open. Method 500 proceeds to 510.

At 510, method 500 pre-selects transmission gears in response to vehicle speed, driver demand torque, and the present desired gear. The pre-selected transmission gear may change with vehicle speed, driver demand torque, and the present desired gear. In one example, the pre-selected gear is a forecasted next desired gear (e.g., a gear that next becomes the desired gear) and the pre-selected gear is locked to a layshaft while a transmission input clutch associated with the pre-selected gear is held open. The pre-selected gear may be a gear that is expected to be a next desired gear. For example, if the present desired gear is third gear and the vehicle is accelerating, the pre-selected gear may be fourth gear. In one example, the pre-selected gear is determined by inputting the present desired gear, vehicle speed, and driver demand torque into a function that outputs the pre-selected gear. If the pre-selected gear changes from a first gear to a second gear, the first gear is unlocked from a layshaft and the second gear is locked to a layshaft in response to the pre-selected gear changing. For example, if the pre-selected gear changes from fifth gear to sixth gear, the sixth gear is unlocked from second layshaft 342 of FIG. 3 and sixth gear is locked to first layshaft 340 of FIG. 3. The pre-selected gear is locked to a layshaft and method 500 proceeds to 512.

At 512, method 500 locks a desired transmission gear in response to vehicle speed, driver demand torque, and the present desired gear. The desired transmission gear may change with vehicle speed and driver demand torque. In one example, the desired gear is a gear that is suited for and determined from the present vehicle speed and present driver demand torque. The desired gear is locked to a layshaft while a transmission input clutch associated with the desired gear is held open. If the desired gear changes from a first gear to a second gear, the first gear is unlocked from a layshaft and the second gear is locked to a layshaft in response to the desired gear changing. For example, if the desired gear changes from fifth gear to sixth gear, the sixth gear is unlocked from second layshaft 342 of FIG. 3 and sixth gear is locked to first layshaft 340 of FIG. 3. The desired gear is locked to a layshaft via a shift fork moving a synchronizer to the desired gear and method 500 proceeds to 514.

At 514, method 500 judges if engine reactivation (e.g., starting combustion in engine cylinders) is requested. Engine reactivation may be requested via a human or autonomous driver requesting torque, a low state of battery charge, or other vehicle conditions. If method 500 judges that engine reactivation is requested, the answer is yes and method 500 proceeds to 516. Otherwise, the answer is no and method 500 returns to 510.

At 516, method 500 starts the engine and accelerates the engine to a speed of the first transmission input shaft (e.g., 302 of FIG. 3) or a speed of the second transmission input shaft (e.g., 304 of FIG. 3) associated with the desired gear. For example, if the second gear (e.g., 322 of FIG. 3) is the desired gear and it is locked to layshaft 340, engine speed is accelerated to a speed of the second transmission input shaft (e.g., 304 of FIG. 3). Accelerating the engine speed to the transmission input shaft speed may reduce torque disturbances in the driveline when one of the transmission input clutches is closed to couple the engine to one of the transmission input shafts.

The engine may be started via a starter motor before the transmission input shaft is closed. However, in alternative examples, the engine may be started via closing the transmission input shaft and using torque from the rear drive unit electric machine or from vehicle wheels to rotate and start the engine. Method 500 proceeds to 518.

At 518, method 500 closes a transmission input clutch associated with the locked gear in response to engine speed substantially equaling (e.g., with ±200 RPM) a speed of a transmission input shaft. For example, if the desired gear is second gear, the second transmission input clutch 127 is closed while the first transmission input clutch 126 is held open. By closing the second transmission input clutch 127, engine torque may be transferred through second gear to vehicle wheels. Alternatively, wheel torque or rear drive unit electric machine torque may be transferred to the engine in cases where the engine is started via wheel torque or electric machine torque. Method 500 proceeds to 520.

At 520, method 500 deactivates the electric transmission pump to conserve electrical energy. Further, the electric transmission pump may be deactivated since a mechanical pump driven via the engine is providing fluid to actuators and components throughout the transmission. Method 500 proceeds to exit after deactivating the electric transmission pump.

In this way, energy used to rotate transmission input shafts may be conserved to charge a battery or to propel a vehicle. Further, transmission gears may be selectively locked and unlocked in response to vehicle speed and driver demand torque so that driveline torque response may be improved.

Thus, the method of FIG. 5 provides for a driveline operating method, comprising: stopping rotation of an engine of a vehicle in response to an engine stop request while the vehicle is moving; and ceasing to rotate a first input shaft and a second input shaft of a transmission at a gear ratio multiple of a transmission output shaft speed in response to the engine stop request while the vehicle is moving, the transmission directly coupled to the engine. The method further comprises continuing to rotate an output shaft of the transmission at a gear ratio multiple of an electric machine. The method further comprises propelling the vehicle via an electric machine while the engine is stopped and rotating first and second layshafts of the transmission while the engine is stopped.

In some examples, the method further comprises opening an input shaft clutch in response to the engine stop request. The method further comprises restarting the engine in response to an engine start request without providing engine power to the first input shaft or the second input shaft. The method further comprising locking a gear to a first layshaft or a second layshaft in response to the engine start request. The method further comprises closing a first or second input clutch of the transmission and providing torque to wheels of the vehicle via the gear and the first layshaft or the second layshaft in response to engine speed equal to a speed of a first input shaft of the transmission or a speed of a second input shaft of the transmission.

The method of FIG. 5 also provides for a driveline operating method, comprising: stopping rotation of an engine of a vehicle in response to an engine stop request while the vehicle is moving via a controller; and decoupling a transmission input shaft from a transmission layshaft via unlocking a first gear locked to the transmission layshaft in response to the engine stop request while the vehicle is moving. The method further comprises moving a synchronizer via a shift fork to unlock the gear. The method further comprises opening an input clutch that selectively transfers torque to vehicle wheels via the transmission input shaft.

In some examples, the method further comprises propelling the vehicle via an electric machine while the engine is stopped and rotating an output shaft of the transmission via the electric machine while the engine is stopped. The method further comprises restarting the engine in response to an engine start request without providing engine power to the input shaft. The method further comprises locking a second gear to the transmission layshaft in response to the engine start request. The method further comprises closing an input clutch and coupling the engine to the second gear in response to engine speed being substantially equal to a speed of the transmission input shaft.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A driveline operating method, comprising:
    stopping rotation of an engine of a vehicle in response to an engine stop request while the vehicle is moving; and
    ceasing to rotate a first input shaft and a second input shaft of a transmission at a gear ratio multiple of a transmission output shaft speed in response to the engine stop request while the vehicle is moving, the transmission coupled to the engine.

2. The method of claim 1, further comprising continuing to rotate an output shaft of the transmission at a gear ratio multiple of an electric machine.

3. The method of claim 1, further comprising propelling the vehicle via an electric machine while the engine is stopped and rotating first and second layshafts of the transmission while the engine is stopped.

4. The method of claim 1, further comprising opening an input shaft clutch in response to the engine stop request while the vehicle is moving.

5. The method of claim 1, further comprising restarting the engine in response to an engine start request without providing engine power to the first input shaft or the second input shaft.

6. The method of claim 5, further comprising locking a gear to a first layshaft or a second layshaft in response to the engine start request.

7. The method of claim 6, further comprising closing a first or second input clutch of the transmission and providing torque to wheels of the vehicle via the gear and the first layshaft or the second layshaft in response to engine speed equal to a speed of the first input shaft of the transmission or a speed of the second input shaft of the transmission.

8. A driveline operating method, comprising:
    stopping rotation of an engine of a vehicle in response to an engine stop request while the vehicle is moving via a controller;
    decoupling a transmission input shaft from a transmission layshaft via unlocking a first gear locked to the transmission layshaft in response to the engine stop request while the vehicle is moving; and
    propelling the vehicle via an electric machine while the engine is stopped and rotating an output shaft of a transmission via the electric machine while the engine is stopped.

9. The method of claim 8, further comprising moving a synchronizer via a shift fork to unlock the first gear.

10. The method of claim 8, further comprising opening an input clutch that selectively transfers torque to vehicle wheels via the transmission input shaft.

11. The method of claim 8, further comprising restarting the engine in response to an engine start request without providing engine power to the transmission input shaft.

12. The method of claim 11, further comprising locking a second gear to the transmission layshaft in response to the engine start request.

13. The method of claim 8, further comprising closing an input clutch and coupling the engine to a second gear in response to engine speed being substantially equal to a speed of the transmission input shaft.

14. A system, comprising:
    an engine;
    a dual clutch transmission coupled to the engine and including a first input clutch, a second input clutch, a first input shaft, a second input shaft, a first layshaft selectively coupled to the first input shaft, a second layshaft selectively coupled to the second input shaft, a plurality of gears, and an output shaft coupled to the first and second layshafts;

a rear drive unit including a rear axle and an electric machine coupled to the dual clutch transmission via a driveshaft; and a controller including executable instructions stored in non-transitory memory to stop rotation of the engine in response to an engine stop request and lock a first gear of the plurality of gears to the first layshaft or the second layshaft in response to a first vehicle speed and a first demand torque.

15. The system of claim 14, further comprising additional instructions to unlock the first gear from the first layshaft or the second layshaft and lock a second gear of the plurality of gears to the first layshaft or the second layshaft in response to a second vehicle speed and a second demand torque.

16. The system of claim 14, further comprising additional instructions to open or hold open the first input clutch and the second input clutch in response to the engine stop request.

17. The system of claim 14, where the first gear is locked to the first layshaft or the second layshaft without transferring torque between the engine and wheels of a vehicle.

18. The system of claim 14, further comprising an electric transmission pump and additional instructions to activate the electric transmission pump in response to the engine stop request.

19. The system of claim 18, further comprising additional instructions to start the engine and deactivate the electric transmission pump after starting the engine in response to an engine start request.

* * * * *